US012645372B2

(12) United States Patent
Zhu et al.

(10) Patent No.: US 12,645,372 B2
(45) Date of Patent: Jun. 2, 2026

(54) STORAGE SYSTEM, DATA ACCESS METHOD, APPARATUS, AND DEVICE

(71) Applicant: Huawei Cloud Computing Technologies Co., Ltd., Guizhou (CN)

(72) Inventors: Qingping Zhu, Xi'an (CN); Ruolin Lin, Xi'an (CN); Bin Su, Gui'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/748,255

(22) Filed: Jun. 20, 2024

(65) Prior Publication Data

US 2024/0338130 A1     Oct. 10, 2024

Related U.S. Application Data

(63) Continuation of application No. PCT/CN2022/115975, filed on Aug. 30, 2022.

(30) Foreign Application Priority Data

Dec. 20, 2021     (CN) .......................... 202111585803.4

(51) Int. Cl.
*G06F 3/06* (2006.01)

(52) U.S. Cl.
CPC .......... *G06F 3/0622* (2013.01); *G06F 3/0637* (2013.01); *G06F 3/067* (2013.01)

(58) Field of Classification Search
None
See application file for complete search history.

(56) References Cited

FOREIGN PATENT DOCUMENTS

| | | |
|---|---|---|
| CN | 112579877 A | 3/2021 |
| JP | 2018010385 A | 1/2018 |
| WO | 2016132433 A1 | 8/2016 |
| WO | 2021231554 A1 | 11/2021 |

*Primary Examiner* — Brian R Peugh
(74) *Attorney, Agent, or Firm* — Conley Rose, P.C.

(57)     ABSTRACT

When target data is to be accessed, a computing node determines whether the target data meets a computing pushdown condition. When the target data meets the computing pushdown condition, send a data access request to a storage node. After receiving the data access request, the storage node obtains a dataset to which the target data belongs, performs the computing service based on the computing indication, accesses the target data in the dataset, and feeds back an access result to the computing node.

20 Claims, 2 Drawing Sheets

STORAGE SYSTEM, DATA ACCESS METHOD, APPARATUS, AND DEVICE

CROSS-REFERENCE TO RELATED APPLICATIONS

This is a continuation of International Patent Application No. PCT/CN2022/115975 filed on Aug. 30, 2022, which claims priority to Chinese Patent Application No. 202111585803.4 filed on Dec. 20, 2021, which are hereby incorporated by reference in their entireties.

TECHNICAL FIELD

This disclosure relates to the field of storage technologies, and in particular, to a storage system, a data access method, an apparatus, and a device.

BACKGROUND

A large object (LOB) is data with a data amount that exceeds a gigabyte (GB), and the LOB may be data with a large data amount, for example, a document, a graphic image, a video, or audio. In order to meet user requirements, common relational databases such as ORACLE, MYSQL, and POSTGRESQL all support the LOB. In other words, data of an LOB type can be stored in the databases.

However, for a storage-compute decoupled storage system (that is, the storage system includes a computing node configured to implement a computing function and a storage node configured to store data), because a data amount of data of an LOB type is large, when the storage node needs to send the data of the LOB type to the computing node, a large network bandwidth is occupied, and large transmission overheads are generated.

SUMMARY

This disclosure provides a storage system, a data access method, an apparatus, and a device, to fully use resources of a storage node, and effectively implement computing pushdown.

According to a first aspect, an embodiment of this disclosure provides a storage system. The storage system includes a computing node and a first storage node. The storage system is a storage-compute decoupled storage system. In the storage system, when determining that target data needs to be accessed, the computing node may first determine whether the target data meets a computing pushdown condition, and after determining that the target data meets the computing pushdown condition, the computing node may send a data access request to the first storage node. The data access request is used to access the target data, the data access request carries a computing indication, and the computing indication indicates a computing service that needs to be performed to access the target data. After receiving the data access request, the first storage node obtains a dataset to which the target data belongs, performs the computing service based on the computing indication, and accesses the target data in the dataset, and feeds back an access result to the computing node.

According to the foregoing system, the computing node can determine a scenario suitable for computing pushdown, so that resources of the storage node can be fully used, and effectiveness of the computing pushdown can be ensured.

In a possible implementation, the computing pushdown condition includes a part or all of the following:

Condition 1: A data type is a specified data type.
Condition 2: A data amount of data is greater than a data amount threshold.
Condition 3: Storage space that needs to be occupied by a dataset to which the data belongs and free storage space in a memory of the computing node meet a preset relationship.
Condition 4: A load of the storage node in which the data is located is less than a load threshold.
Condition 5: A computing manner that needs to be performed on the data is a preset computing manner.
Condition 6: A data access manner does not support a lock query.

The foregoing computing pushdown condition is merely an example. Specific content of the computing pushdown condition is not limited in this embodiment of this disclosure. Any condition that needs to be met and that is applicable to a scenario of implementing computing pushdown may be used as the computing pushdown condition.

According to the foregoing system, there are a plurality of computing pushdown conditions that are applicable to different scenarios of the computing pushdown.

In a possible implementation, the dataset to which the target data belongs may be distributed in different storage nodes, for example, may be distributed in the first storage node and a second storage node. In other words, a part of data in the dataset is stored in the first storage node and the second storage node. When obtaining the dataset to which the target data belongs, the first storage node may first determine the storage nodes in which the dataset is distributed, and obtain, from the distributed storage nodes, the data in the dataset stored in the distributed storage nodes. For example, when determining that a part of data in the dataset is stored in the second storage node, the first storage node may obtain the part of data from the second storage node.

According to the foregoing system, in the storage system, storage nodes may interact with each other to perform data transmission. This avoids a case in which the computing node needs to interact, for a plurality of times, with the storage nodes in which the dataset is distributed, and can ensure that computing pushdown can be effectively and efficiently performed.

In a possible implementation, when the first storage node performs the computing service based on the computing indication, and accesses the target data in the dataset, there are a plurality of computing services performed based on the computing indication. The following lists several types of the computing services.

First Type: Row Clipping:
The first storage node may extract, from the dataset, one or more rows of data that meet a first condition, where the one or more rows of data are the target data.

Second Type: Column Clipping:
The first storage node may extract, from the dataset, one or more columns of data that meet a second condition, where the one or more columns of data are the target data.

Third Type: Aggregation Operation:
After extracting the target data in the dataset, the first storage node may further perform computation (for example, summation, averaging, obtaining a minimum value, or obtaining a maximum value) on the target data. In other words, the computing service needs to be further performed on the target data, to obtain a computing result.

According to the foregoing system, the storage node can perform a plurality of different computing services. This is applicable to different scenarios of computing pushdown, and effectively expands an application scope.

According to a second aspect, an embodiment of this disclosure provides a data access method. The method may be performed by a computing node in a storage system. For beneficial effects, refer to the related descriptions of the first aspect. Details are not described herein again. In the method, when needing to access target data, the computing node may first determine whether the target data meets a computing pushdown condition. When determining that the to-be-accessed target data meets the computing pushdown condition, the computing node may send a data access request to a storage node in a storage node, where the data access request is used to access the target data, the data access request carries a computing indication, and the computing indication indicates a computing service that needs to be performed to access the target data, and then obtain, from the storage node, an access result of accessing the target data by the storage node.

In a possible implementation, the computing pushdown condition includes a part or all of the following:

Condition 1: A data type is a specified data type.

Condition 2: A data amount of data is greater than a data amount threshold.

Condition 3: Storage space that needs to be occupied by a dataset to which the data belongs and free storage space in a memory of the computing node meet a preset relationship.

Condition 4: A load of the storage node in which the data is located is less than a load threshold.

Condition 5: A computing manner that needs to be performed on the data is a preset computing manner.

Condition 6: A data access manner does not support a lock query.

The foregoing computing pushdown condition is merely an example. Specific content of the computing pushdown condition is not limited in this embodiment of this disclosure. Any condition that needs to be met and that is applicable to a scenario of implementing computing pushdown may be used as the computing pushdown condition, and is applicable to this embodiment of this disclosure.

According to a third aspect, an embodiment of this disclosure provides a data access method. The method may be performed by a storage node in a storage system. For beneficial effects, refer to the related descriptions of the first aspect. Details are not described herein again. In the method, the storage node may receive a data access request from a computing node in the storage system, where the data access request is used to access target data, the data access request carries a computing indication, and the computing indication indicates a computing service that needs to be performed to access the target data. After receiving the data access request, the storage node may obtain a dataset to which the target data belongs, perform the computing service based on the computing indication, and access the target data in the dataset, and may further feed back, to the computing node, an access result of accessing the target data.

In a possible implementation, when the storage node obtains the dataset to which the target data belongs, if the dataset is distributed in the storage node, and is further distributed in another storage node, the storage node obtains data in a locally stored dataset, and may further obtain data in the dataset from the other storage node. In other words, after determining that a part of data in the dataset is stored in the other storage node in the storage system, the storage node may obtain the part of data from the other storage node.

In a possible implementation, when the storage node performs the computing service based on the computing indication, and accesses the target data in the dataset, there are a plurality of computing services performed based on the computing indication. The following lists several types of the computing services.

First Type: Row Clipping:

The storage node may extract, from the dataset, one or more rows of data that meet a first condition, where the one or more rows of data are the target data.

Second Type: Column Clipping:

The storage node may extract, from the dataset, one or more columns of data that meet a second condition, where the one or more columns of data are the target data.

Third Type: Aggregation Operation:

After extracting the target data in the dataset, the storage node may further perform computation (for example, summation, averaging, obtaining a minimum value, or obtaining a maximum value) on the target data. In other words, the computing service needs to be further performed on the target data, to obtain a computing result.

According to a fourth aspect, an embodiment of this disclosure further provides a data access apparatus. For beneficial effects, refer to the descriptions of the first aspect. Details are not described herein again. The apparatus has a function of implementing the behavior in the method example of the second aspect. The function may be implemented by hardware, or may be implemented by hardware executing corresponding software. The hardware or the software includes one or more modules corresponding to the foregoing functions. In a possible design, a structure of the apparatus includes a determining unit, a sending unit, and a receiving unit. The units may perform corresponding functions in the method example of the second aspect. For details, refer to the detailed descriptions in the method example. Details are not described herein again.

According to a fifth aspect, an embodiment of this disclosure further provides a data computing apparatus. For beneficial effects, refer to the descriptions of the first aspect. Details are not described herein again. The apparatus has a function of implementing the behavior in the method example of the third aspect. The function may be implemented by hardware, or may be implemented by hardware executing corresponding software. The hardware or the software includes one or more modules corresponding to the foregoing functions. In a possible design, a structure of the apparatus includes a receiving unit, a computing unit, and a sending unit. The units may perform corresponding functions in the method example of the third aspect. For details, refer to the detailed descriptions in the method example. Details are not described herein again.

According to a sixth aspect, an embodiment of the present disclosure provides a computing device. The computing device includes a processor and a memory, and may further includes a network interface card. The processor may invoke program instructions in the memory, to enable the computing device to perform the method according to any one of the second aspect or the possible implementations of the second aspect. The memory is coupled to the processor, and stores program instructions and data that are necessary for performing a data transmission method. The network interface card is configured to communicate with another device and transmit data, for example, send a data access request to a storage node or receive an access result from the storage node.

Alternatively, the processor may invoke program instructions in the memory, to enable the computing device to perform the method according to any one of the third aspect or the possible implementations of the third aspect. The memory is coupled to the processor, and stores program instructions and data that are necessary for performing a data transmission method. The network interface card is configured to communicate with another device and transmit data, for example, receive a data access request from a receiving node or feed back an access result to a computing node.

According to a seventh aspect, this disclosure provides a non-transitory readable storage medium. When the non-transitory readable storage medium is executed by a computing device, the computing device may perform the method according to any one of the second aspect or the possible implementations of the second aspect. When the non-transitory readable storage medium is executed by the computing device, the computing device may alternatively perform the method according to any one of the third aspect or the possible implementations of the third aspect. The storage medium stores a program. The storage medium includes but is not limited to a volatile memory, for example, a random-access memory (RAM), and a non-volatile memory, for example, a flash memory, a hard disk drive (HDD), or a solid-state drive (SSD).

According to an eighth aspect, this disclosure provides a computing device program product. The computing device program product includes computer instructions. When the computer instructions are executed by a computing device, the computing device may perform the method according to any one of the second aspect or the possible implementations of the second aspect. When the computer instructions are executed by the computing device, the computing device may alternatively perform the method according to any one of the third aspect or the possible implementations of the third aspect. The computer program product may be a software installation package. When the method according to any one of the second aspect or the possible implementations of the second aspect needs to be used, the computer program product may be downloaded and the computer program product may be executed on the computing device.

DESCRIPTION OF EMBODIMENTS

In addition to a storage function, a storage system further needs to have a computing function. The computing function means that the storage system can perform simple processing on data, for example, filtering and sorting. When a node in a storage system has both a storage function and a computing function, this storage system may be referred to as a storage-compute coupled storage system. When a storage system includes a node having a storage function and a node having a computing function, and the storage function and the computing function in this storage system are decoupled, this storage system may be referred to as a storage-compute decoupled storage system.

Figure 1:
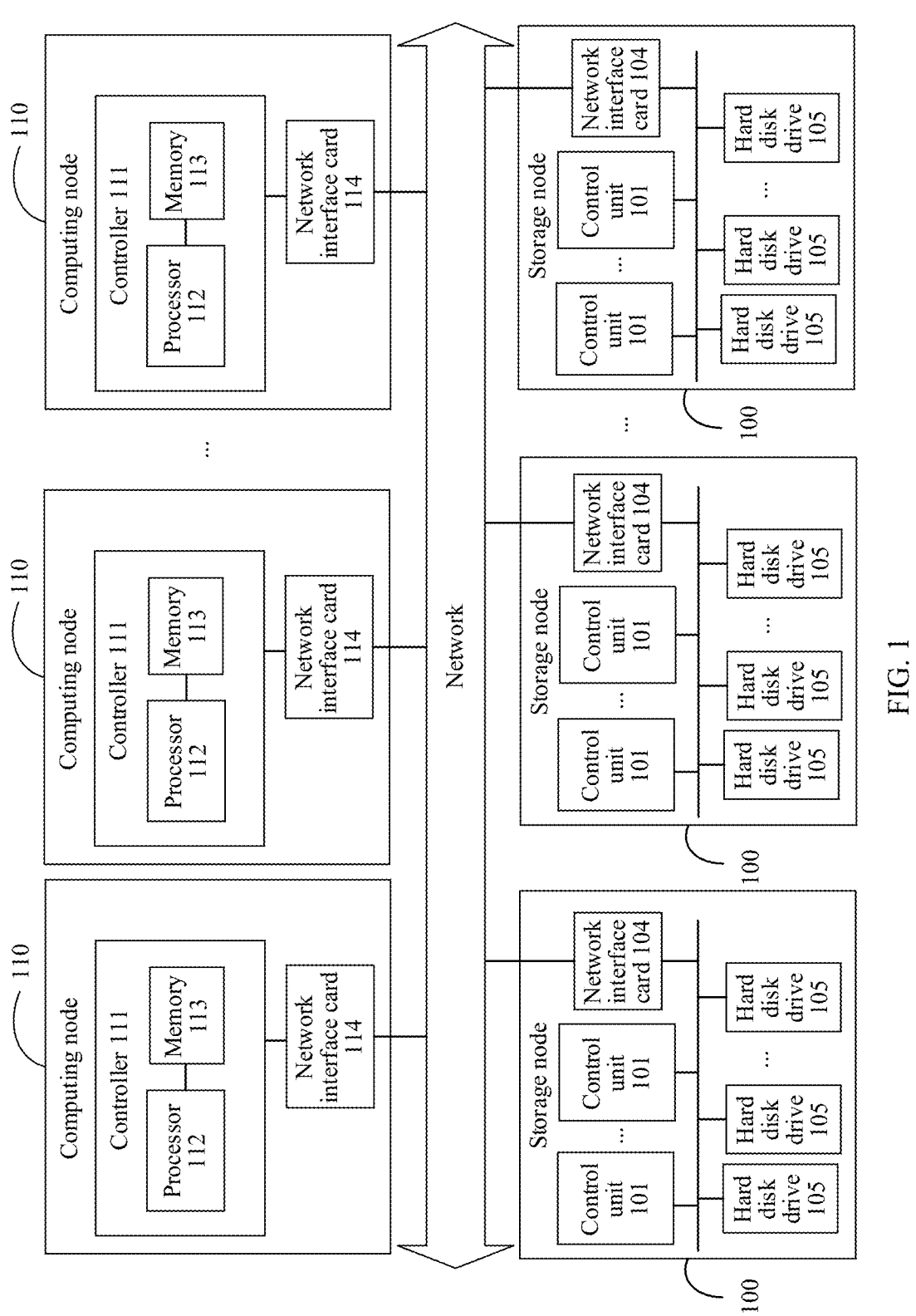
FIG. 1 is a diagram of an architecture of a system according to this disclosure.

FIG. 1 shows a storage system to which embodiments are applicable. The storage system is a storage-compute decoupled storage system. The storage system includes a computing node cluster and a storage node cluster. The computing node cluster includes one or more computing nodes 110 (FIG. 1 shows three computing nodes 110, but is not limited to three computing nodes 110). The computing nodes 110 may communicate with each other. The computing node 110 is a computing device having a computing function. The computing node 110 may be a server, a desktop computer, a controller of a storage array, or the like.

Functionally, a main function of the computing node 110 is to perform a computing service. The computing node 110 may process a data access instruction sent by a client. The computing node 110 may parse the data access instruction initiated by the client, to determine target data that needs to be accessed by the client and a dataset to which the target data belongs, and determine a storage node in which the dataset is located.

A database is used as an example. For a relational database, the dataset may be understood as a table, and the target data may be understood as a part of data in the table, for example, a part of columns or a part of rows. For a non-relational database, the dataset may be understood as a file that includes a plurality of key-value pairs, a file that includes a plurality of columns, or a graph that includes a plurality of entities or entity relationships. The target data may be understood as a part of key-value pairs or a part of columns in the file, or may be a part of entities and a part of entity relationships in the graph.

Generally, after the computing node 110 determines the dataset to which the target data belongs, the computing node 110 may initiate a data request to the storage node in which the dataset is located, to request to obtain the dataset. After the dataset is obtained, the target data in the dataset is accessed based on the data access instruction, and the computing service is performed. However, in embodiments of this disclosure, the computing node 110 has determining logic, and determines, based on a determining result, whether to push down a part or all of computing services to the storage node 100, and indicate the storage node 100 to access data based on a computing indication. Therefore, in embodiments of this disclosure, after determining the storage node in which the dataset is located, the computing node 110 may further determine whether the target data meets a computing pushdown condition. When the computing node 110 determines that the target data meets the computing pushdown condition, the computing node 110 may initiate a data access request to the storage node 100. The data access request is used to request to access the target data and carries a computing indication, and the computing indication indicates a computing service that needs to be performed by the storage node 100.

Structurally, as shown in FIG. 1, the computing node 110 includes a controller 111. The controller 111 includes at least a processor 112 and a memory 113. The computing node 110 may further include a network interface card 114.

The processor 112 may be a central processing unit (CPU), and is configured to process a data access request from the outside of the computing node 110 or a request generated in the computing node 110.

The memory 113 is an internal memory that directly exchanges data with the processor 112, and may be a RAM or a read-only memory (ROM). The RAM may be a dynamic RAM (DRAM) or a storage class memory (SCM). The memory 113 may further include another RAM, for example, a static RAM (SRAM).

The network interface card 114 is configured to communicate with the storage node 100. The computing node 110 may send a request to the storage node 100 via the network interface card 114 to perform persistent storage on data, or may send a request to the storage node 100 via the network interface card 114 to obtain data from the storage node. In addition, the computing node 110 may further include a bus used for communication between the components in the computing node 110. During actual implementation, the computing node 110 may alternatively have a small quantity of built-in hard disk drives, or may be connected to a small quantity of external hard disk drives.

The storage node cluster includes a plurality of storage nodes 100 (where FIG. 1 shows three storage nodes 100, but is not limited to three storage nodes 100, and to distinguish between the three storage nodes 100, a storage node 100A, a storage node 100B, and a storage node 100C may be used).

Functionally, a main function of the storage node 100 is to store data. Each storage node includes physical storage space, and the physical storage space is an actual location at which the data is stored. The data stored in the storage node may be data in the database. Databases may be classified into relational databases and non-relational databases. For a relational database, the storage node 100 may store a table in the relational database. For a non-relational database for key-value pair storage, the storage node 100 may store a key-value pair in the non-relational database. For a non-relational database for document storage, the storage node 100 may store a file (where the file may include a plurality of key-value pairs) in the non-relational database. For a non-relational database for a column-oriented database, the storage node 100 may store a file or a table that includes a plurality of columns of data and that is in the non-relational database. For a graph-type non-relational database (or graph database), the storage node 100 may store a graph that includes one or more entities and entity relationships and that is in the non-relational database.

Generally, the storage node 100 only needs to feed back, to the computing node 110 based on the data request of the computing node 110, the dataset to which the target data belongs. In embodiments of this disclosure, after receiving the data access request of the computing node 110, the storage node 100 may obtain the dataset to which the target data belongs. The storage node 100 may further access the target data in the dataset based on the data access request, and perform the computing service.

Structurally, one storage node 100 includes one or more control units 101, a network interface card 104, and a plurality of hard disk drives 105. The network interface card 104 is configured to communicate with the computing node 110. The hard disk drive 105 is configured to store data, and may be a magnetic disk or another type of storage medium, for example, a solid-state drive or a shingled magnetic recording hard disk drive. The control unit 101 is configured to write data into the hard disk drive 105 or read data from the hard disk drive 105 based on the data access request sent by the computing node 110. In a data read or write process, the control unit 101 needs to convert an address carried in the data access request into an address that can be identified by the hard disk drive.

The control unit 101 may have various forms. For example, the control unit 101 may include a CPU and a memory. The CPU is configured to perform operations such as address conversion and data read or write. The memory is configured to temporarily store data that is to be written into the hard disk drive 105, or read, from the hard disk drive 105, data that is to be sent to the computing node 110. In another case, the control unit 101 may alternatively be a programmable electronic component, for example, a data processing unit (DPU). Optionally, the DPU may alternatively be replaced with a processing chip such as a graphics processing unit (GPU) or an embedded neural-network processing unit (NPU).

For another example, a function of the control unit 101 may be offloaded to the network interface card 104. In other words, the storage node 100 does not have the control unit 101, and the network interface card 104 completes data read or write, address conversion, and another computing function. In this case, the network interface card 104 is an intelligent network interface card. The memory 113 is configured to temporarily store data that is to be written into the hard disk drive 105, or read, from the hard disk drive 105, data that is to be sent to the computing node 110. There is no homing relationship between the network interface card 104 and the hard disk drive 105 in the storage node 100, and the network interface card 104 may access any hard disk drive 105 in the storage node 100. Therefore, it is convenient to expand the hard disk drive when storage space is insufficient.

In embodiments of this disclosure, to effectively use resources (for example, the control unit 101) of the storage node 100, the computing node 110 may push down a part or all of the computing services in the computing node 110 to the storage node 100, in other words, some computing services that need to be implemented in the computing node 110 may be apportioned to the storage node 100. Computing pushdown can be implemented in a storage-compute decoupled storage system. In embodiments of this disclosure, the computing node 110 has determining logic, and can determine a scenario for implementing the computing pushdown. This effectively uses the resources of the storage node 100, and improves computing pushdown efficiency to some extent.

Figure 2:
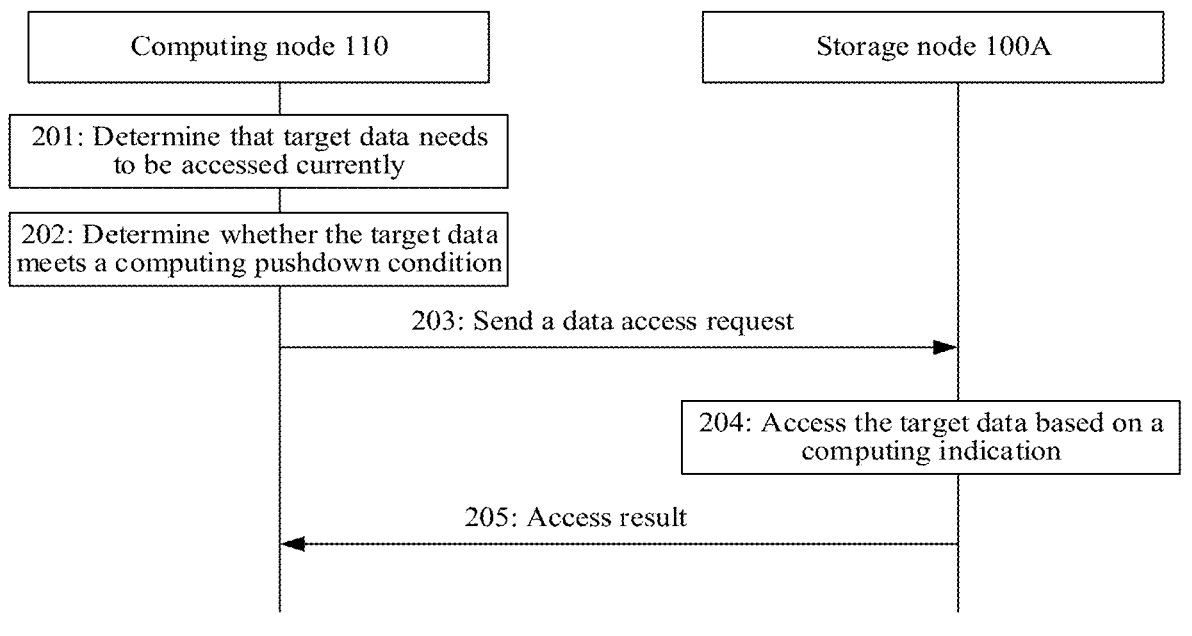
FIG. 2 is a diagram of a data access method according to this disclosure.

The following describes a data access method provided in an embodiment of this disclosure with reference to FIG. 2. The method includes the following steps.

Step 201: A computing node 110 determines that target data needs to be accessed currently.

Scenario 1: A user may initiate, to the computing node 110 via a client deployed on a user side, a data access instruction used to access the target data. The data access instruction may carry a logical address of the target data or a logical address of a dataset to which the target data belongs. Optionally, the data access instruction may further include an identifier of the dataset to which the target data belongs, and the like.

There are many manners that are of accessing the target data and that are indicated by the data access instruction. For example, if the user only needs to obtain a part of data (a part of rows or a part of columns of data) in a table, the data access instruction indicates to obtain the part of data in the table. For another example, if the user needs to obtain a quantity of rows that meet a specific requirement and that are in a table, the data access instruction indicates to calculate the quantity of rows that meet the specific requirement and that are in the table.

Scenario 2: When needing to process data in a storage node 100 (for example, perform processing such as error detection and clustering on the data in the storage node 100), the computing node 110 determines the target data that needs to be accessed.

Step 202: The computing node 110 determines whether the target data meets a computing pushdown condition.

When determining that the target data needs to be accessed, the computing node 110 may determine whether the target data meets the computing pushdown condition. In this embodiment of this disclosure, the computing push-down condition includes a part or all of the following:

A data type is a specified data type, a data amount is greater than a data amount threshold, storage space that needs to be occupied by a dataset to which the data belongs is greater than free storage space in a memory of the computing node 110, a load of the storage node 100 in which the data is located is less than a load threshold, a computing manner that needs to be performed on the data is a preset computing manner, and a data access manner does not support a lock query.

The following separately describes the six conditions.

Condition 1: The data type is the specified data type.

To store data in a database, the storage node 100 further stores some auxiliary data such as temporary data, metadata, and system data used to describe a storage system.

The auxiliary data is usually data that needs to be parsed by the computing node 110, and does not need to be calculated by the storage node 100. When the target data is the auxiliary data, computing pushdown is not applicable. When the target data is the data in the database, computing pushdown can be performed.

Condition 2: The data amount is greater than the data amount threshold.

When the computing pushdown is not performed, when reading the data from the storage node 100, the computing node 110 obtains, from the storage node 100, the dataset to which the data belongs. After obtaining the dataset, the computing node 110 extracts, from the dataset, data that needs to be accessed, or processes the dataset to generate a processing result.

For a relational database, the dataset to which the target data belongs may be a table. For a non-relational database, the dataset to which the target data belongs may be a file or a graph. The relational database is used as an example. The target data that usually needs to be accessed by the computing node 110 is a part of data in the table. When obtaining the data from the storage node 100, the computing node 110 obtains the entire table to which the target data belongs. After obtaining the table, the computing node 110 may perform a computing service on the table. For example, the computing node 110 may obtain, from the table, the data that needs to be accessed, or access the table to obtain an access result. In this embodiment of this disclosure, the computing node 110 may not obtain the entire table, and the storage node 100 extracts the data from the table or processes the table. In other words, the computing node 110 may apportion the computing service to the storage node 100.

When the computing node 110 apportions the computing service to the storage node 100, the computing node 110 may directly indicate the target data that needs to be accessed by the storage node 100, and the storage node 100 feeds back, to the computing node 110, a result of accessing the target data.

It can be learned that when the storage node 100 performs the computing service, the storage node 100 needs to process the dataset. The data amount of the data is usually reduced through such processing.

For a dataset with a large data amount, when the storage node 100 performs the computing service and processes the dataset, a large data amount is reduced, a computing push-down effect is definite, and performance is also greatly improved. For a dataset with a small data amount, when the storage node 100 performs the computing service and pro-cesses the dataset, a small data amount is reduced, a com-puting pushdown effect is weak, and performance is slightly improved. That is, a larger dataset to which the data accessed by the computing node 110 belongs indicates a more definite computing pushdown effect.

Therefore, the computing node 110 may configure the data amount threshold. When a data amount of the dataset to which the data belongs is greater than the data amount threshold, the computing pushdown is applicable. When a data amount of the dataset to which the data belongs is not greater than the data amount threshold, the computing pushdown is not applicable.

Condition 3: The storage space that is occupied by the dataset to which the data belongs and the free storage space in the memory of the computing node meet the preset relationship. For example, the storage space that needs to be occupied by the dataset to which the data belongs is greater than or equal to the free storage space in the memory of the computing node 110. For another example, a difference between the storage space that needs to be occupied by the dataset to which the data belongs and the free storage space in the memory of the computing node 110 is greater than a threshold.

When the computing pushdown is not performed, after the computing node 110 obtains the dataset from the storage node 100, the obtained dataset may be stored in the memory of the computing node 110. If the storage space that needs to be occupied by the dataset and the free storage space in the memory of the computing node 110 are close, and meet the preset relationship (for example, one of the storage space that needs to be occupied by the dataset and the free storage space is greater than or equal to the other one, and the difference between the storage space that needs to be occu-pied by the dataset and the free storage space is greater than the threshold), the dataset may not entirely exist in the memory of the computing node 110.

It can be learned from the foregoing descriptions that when the storage node 100 performs the computing service, the data amount is usually reduced. In this case, after the storage node 100 processes the dataset, storage space that needs to be occupied by processed data is probably less than or equal to the free storage space in the memory of the computing node 110. In this case, the computing pushdown is applicable.

Condition 4: The load of the storage node 100 in which the data is located is less than the load threshold.

The computing pushdown is implemented to effectively use resources (for example, a control unit 101) of the storage node 100. In other words, a prerequisite for the computing pushdown is that an idle resource that can be used to perform the computing service exists in the storage node 100. The load of the storage node 100 can represent a resource that is of the storage node 100 and that has been occupied currently. When the load of the storage node 100 is high, it is unfavorable for the storage node 100 to perform the com-puting service. When the load of the storage node 100 is low, an idle resource that can be used to perform the computing service exists in the storage node 100. Therefore, the com-puting node 110 may set the load threshold for the storage node 100. When determining whether the computing push-down needs to be performed, the computing node 110 may interact with the storage node 100 in which the data is located, to determine a current load of the storage node 100. The storage node 100 in which the data is located may be determined by the computing node 110 based on a logical address of the data.

Condition 5: The computing manner that needs to be performed on the data is the preset computing manner.

For the computing pushdown, not all computing services are suitable to be pushed down to the storage node 100 for performing by the storage node 100. The computing node 110 may selectively select a computing service that is suitable to be pushed down to the storage node 100. The computing service may be understood as a computing manner performed on the data.

In this embodiment of this disclosure, the computing node 110 may configure one or more computing manners that are suitable to be performed by the storage node 100. For the relational database, the one or more computing manners that are suitable to be performed by the storage node 100 may be extracting the data at a granularity of a row, or may be extracting the data at a granularity of a column, or may be aggregating the data. For the non-relational database, the one or more computing manners that are suitable to be performed by the storage node 100 may be extracting a specific key-value pair, or may be extracting data in a specific column, or may be aggregating a specific key-value pair or column, or may be extracting a part of entities or entity relationships in the graph.

Condition 6: The data access manner does not support the lock query.

The lock query means that the target data that needs to be queried for cannot be modified. In this case, the computing node usually does not need to perform the computing service on the found target data, and correspondingly, the computing node does not need to apportion the computing service to the storage node.

For example, a data access request initiated by the client indicates that data that needs to be read is used for update or sharing (that is, select for update/share). The data needs to be used for update or sharing, in other words, the data that needs to be read should be original data, that is, the lock query is not supported. In this case, the computing push-down is not applicable. Another example is a query operation of a serializable isolation level.

Contrary to the lock query, a query manner that supports modification exists. For example, a data access request initiated by the client indicates to read a column of data from the table named user, that is, Select count(*) from user.

Step 203: After determining that the target data meets the computing pushdown condition, the computing node 110 sends a data access request to the storage node 100 in which the target data is located, where the data access request is used to request to access the target data, and the data access request carries a computing indication. Herein, an example in which the storage node 100 in which the target data is located is a storage node 100A is used.

The computing node 110 determines, based on the logical address of the target data or the logical address of the dataset to which the target data belongs, the storage node 100 in which the target data is located. After determining the storage node 100A in which the data is located, the computing node 110 may send the data access request to the storage node 100A.

If the computing node 110 determines that the target data meets the computing pushdown condition, it indicates that the computing service can be apportioned to the storage node 100. The computing node 110 may include the computing indication in the data access request. The computing indication indicates a computing manner that needs to be performed when the target data is accessed. In other words, the computing indication is used to notify the storage node 100A of a computing service that needs to be performed.

Step 204: After receiving the data access request, the storage node 100A accesses the target data based on the computing indication.

When accessing the target data based on the computing indication, the storage node 100A may first obtain the dataset to which the target data belongs, and then access the target data in the dataset based on the computing indication.

When receiving the data access request from the computing node 110, the storage node 100A further needs to perform layer-by-layer conversion on the logical address of the dataset, to convert the logical address into a physical address that can be identified by a hard disk drive. After obtaining the physical address, the storage node 100 may obtain, from the hard disk drive based on the physical address, the dataset to which the target data belongs.

In a storage node cluster, data is stored at a granularity of a minimum unit. For ease of description, a minimum unit of data storage is referred to as a page, and a page size may be fixed. Storage space of each storage node 100 may be divided into one or more pages. For small data, the data may be entirely stored in one page. For large data, for example, an LOB, the data needs to be stored in a plurality of pages, and the plurality of pages may be distributed in different storage nodes 100. In other words, when data with a large data amount is distributed on different storage nodes 100, in the storage node cluster, the storage nodes 100 jointly maintain global paging layout information, and the global paging layout information records a page on which data is located and a storage node 100 in which the page is located.

It can be learned that when the storage node 100A obtains the dataset to which the target data belongs, two possible cases exist.

Case 1: The dataset is stored in the storage node 100A.

After the storage node 100A receives the data access request initiated by the computing node 110, the storage node 100A determines, based on the logical address of the target data or the logical address of the dataset and the global paging layout information that are carried in the data access request, that the dataset to which the target data belongs is distributed in the storage node 100A. The storage node 100A may obtain the dataset based on the logical address of the dataset.

Case 2: The dataset is distributed in a plurality of storage nodes 100, and the storage node 100A is only one of the storage nodes 100.

Generally, when the dataset is distributed on a plurality of different storage nodes 100, the storage node 100 in which the dataset is located and that is determined by the computing node 110 based on the logical address of the dataset is only one of the different storage nodes 100. When needing to access the entire dataset, the computing node 110 initiates a data request to the determined storage node 100A, to access the dataset. After receiving the data request, the storage node 100 may determine, based on the global paging layout information, another storage node 100 in which the dataset is distributed and an address of the dataset in the other storage node 100 (where actually, the address is an address of a part of data in the dataset in the other storage node 100). The storage node 100 notifies the computing node 110 of the other storage node 100 in which the data is distributed and the address of the dataset in the other storage node 100. In this way, the computing node 110 may send a data request to the other storage node 100, to request to obtain the part of data in the dataset from the other storage node 100. This data access manner often occurs when the accessed data is an LOB. In this data access manner, the computing node 110 interacts with the storage node 100 for a plurality of times to obtain the entire dataset.

In this embodiment of this disclosure, to reduce a quantity of times of interaction between the computing node 110 and each storage node 100, reduce an amount of data transmitted between the computing node and the storage node, and ensure that the storage node 100 can better apportion the computing service, after the storage node 100A receives the data access request initiated by the computing node 110, if the storage node 100A determines, based on the logical address of the target data or the logical address of the dataset and the global paging layout information that are carried in the data access request, that the dataset to which the target data belongs is distributed in a plurality of storage nodes 100, where the plurality of storage nodes 100 are classified into the storage node 100A, a storage node 100C, and a storage node 100B, in addition to obtaining a part of data in a locally stored dataset, the storage node 100A may interact with the storage node 100C and the storage node 100B, to obtain remaining data in the dataset from the storage node 100C and the storage node 100B.

Regardless of which manner is used, after obtaining the dataset, the storage node 100A may access the target data in the dataset based on the computing indication, and perform the computing service.

For the relational database, the following lists three computing manners.

Manner 1: Row Clipping:

Row clipping is to clip a table in a database at a granularity of a row, and only a part of rows that meet a requirement are extracted.

A MYSQL database is used as an example. A table named customer includes columns such as json_column and gender, where json_column is of a JSON data type, and an expression json_column->"$.id">=1 AND json_column->"$.id"<=10 may be used as a computing indication. The expression indicates that a row whose json_column identifier (id) is greater than or equal to 1 and less than or equal to 10 may be selected from the table named customer.

Manner 2: Column Clipping:

Column clipping is to clip a table in a database at a granularity of a column, and only a part of columns that meet a requirement are extracted.

The foregoing table named customer is still used as an example. A computing indication may indicate that only two columns json_column and gender are extracted, and another column does not need to be extracted.

Manner 3: Aggregation Operation:

The aggregation operation is performing summarization on a table in a database, to obtain a summarization result. Summarization herein includes but is not limited to: counting, obtaining a maximum value (max), obtaining a minimum value (min), averaging (avg), summation (sum), and the like.

Counting is used as an example. An expression SELECT COUNT(json_column) FROM customer may be used as a computing indication, to indicate to count a column json_column in the table named customer.

Optionally, when the table named customer is distributed in different storage nodes 100, the computing node 110 may indicate one of the storage nodes 100 to count the table named customer, where the storage node 100 counts a part of data in the stored table named customer, and may further indicate a storage node 100 other than the storage node 100 to count the part of data in the stored table named customer. The other storage node 100 may feed back a count value to the storage node 100. After a count value obtained by the storage node 100 through counting and the count value fed back by the other storage node 100 are summarized, a summarized count value is fed back to the computing node 110.

The computing node 110 may alternatively indicate each storage node 100 to count a part of data in a table named customer stored in the storage node 100, and obtain a count value from the storage node 100. The computing node 110 then summarizes obtained count values.

For the non-relational database, the following lists three computing manners.

Manner 1: Attribute Extraction:

This manner is applicable to a non-relational database for key-value pair storage or file storage. The attribute extraction indicates that only a part of key-value pairs is extracted.

Manner 2: Column Clipping:

This manner is applicable to a non-relational database for column-oriented storage. Column clipping indicates that only a part of columns in the file can be extracted.

Manner 3: Aggregation Operation:

An aggregation operation for the non-relational database is similar to an aggregation operation for the relational database. For details, refer to the foregoing descriptions. Details are not described herein again.

Manner 4: Entity Extraction:

This manner can be used for a graph-type non-relational database. The entity extraction indicates that only a part of entities or a part of entity relationships in a graph can be extracted.

The foregoing computing manners are merely examples. A computing manner performed by the computing indication is not limited in this embodiment of this disclosure. Any computing manner that can be performed by the storage node 100 is applicable to this embodiment of this disclosure.

Step 205: The storage node 100A feeds back an access result to the computing node 110.

After accessing the target data based on the computing indication, the storage node 100A obtains the access result. The access result may be the target data extracted from the dataset, or may be a result obtained by performing the aggregation operation on the target data. The storage node 100 may feed back the access result to the computing node 110.

Figure 3:
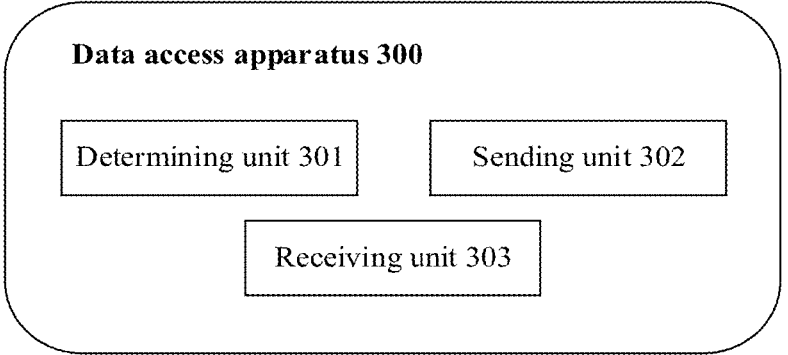
FIG. 3 is a diagram of a structure of a data access apparatus according to this disclosure.

Based on a same concept as the method embodiment, an embodiment of this disclosure further provides a data access apparatus. The data access apparatus is configured to perform the method performed by the computing node 110 in the method embodiment shown in FIG. 2. As shown in FIG. 3, the data access apparatus 300 includes a determining unit 301, a sending unit 302, and a receiving unit 303. The units may be software modules. Further, in the data access apparatus 300, a connection is established between the units through a communication path.

The determining unit 301 is configured to determine that to-be-accessed target data meets a computing pushdown condition.

The sending unit 302 is configured to send a data access request to a storage node in a storage node, where the data access request is used to access the target data, the data access request carries a computing indication, and the computing indication indicates a computing service that needs to be performed to access the target data.

The receiving unit 303 is configured to obtain, from the storage node, an access result of accessing the target data by the storage node.

In a possible implementation, the computing pushdown condition includes a part or all of the following:

A data type is a set data type.

A data amount of data is greater than a data amount threshold.

Storage space that needs to be occupied by a dataset to which the data belongs and free storage space in a memory of a computing node meet a preset relationship.

A load of a storage node in which the data is located is less than a load threshold.

A computing manner that needs to be performed on the data is a preset computing manner.

A data access manner does not support a lock query.

Figure 4:
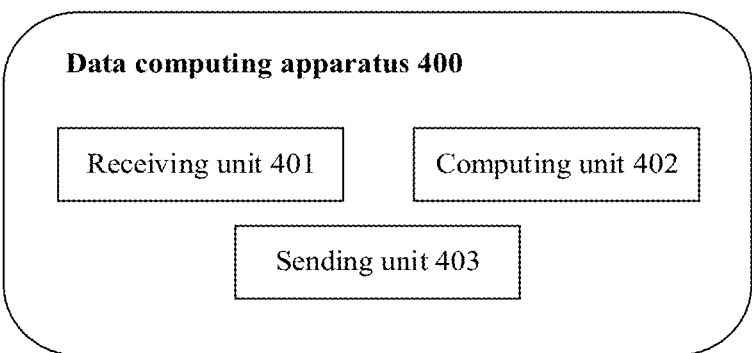
FIG. 4 is a diagram of a structure of a data computing apparatus according to this disclosure.

Based on a same concept as the method embodiment, an embodiment of this disclosure further provides a data computing apparatus. The data computing apparatus is configured to perform the method performed by the storage node 100A in the method embodiment shown in FIG. 2. As shown in FIG. 4, the data computing apparatus 400 includes a receiving unit 401, a computing unit 402, and a sending unit 403. The units may be software modules. Further, in the data computing apparatus 400, a connection is established between the units through a communication path.

The receiving unit 401 is configured to receive a data access request from a computing node in a storage system, where the data access request is used to access target data, the data access request carries a computing indication, and the computing indication indicates a computing service that needs to be performed to access the target data.

The computing unit 402 is configured to obtain a dataset to which the target data belongs, perform the computing service based on the computing indication, and access the target data in the dataset.

The sending unit 403 is configured to feed back, to the computing node, an access result of accessing the target data.

In a possible implementation, when the computing unit 402 obtains the dataset to which the target data belongs, if determining that a part data in the dataset is stored in another storage node in the storage system, the computing unit 402 may obtain the part data from the other storage node.

In a possible implementation, when the computing unit 402 performs the computing service based on the computing indication, and accesses the target data in the dataset, there are a plurality of computing services performed based on the computing indication. The following lists several types of the computing services.

First Type: Row Clipping:

The computing unit 402 may extract, from the dataset, one or more rows of data that meet a first condition, where the one or more rows of data are the target data.

Second Type: Column Clipping:

The computing unit 402 may extract, from the dataset, one or more columns of data that meet a second condition, where the one or more columns of data are the target data.

Third Type: Aggregation Operation:

After extracting the target data in the dataset, the computing unit 402 may further perform computation (for example, summation, averaging, obtaining a minimum value, or obtaining a maximum value) on the target data. In other words, the computing service needs to be further performed on the target data, to obtain a computing result.

In embodiments of this disclosure, division into the units is an example, is merely logical function division. During actual implementation, another division manner may be used. In addition, the functional units in embodiments of this disclosure may be integrated into one processor, each unit may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions may be implemented in a form of a software product. The computer software product is stored in a storage medium and includes several instructions for instructing a terminal device (which may be a personal computer, a mobile phone, a network device, or the like) or a processor to perform all or a part of the steps of the method in embodiments of this disclosure. The foregoing storage medium includes various media that can store program code, such as a Universal Serial Bus (USB) flash drive, a removable hard disk, a ROM, a RAM, a magnetic disk, or an optical disc.

Descriptions of procedures corresponding to the foregoing accompanying drawings have respective focuses. For a part that is not described in detail in a procedure, refer to related descriptions of another procedure.

All or a part of the foregoing embodiments may be implemented by software, hardware, firmware, or any combination thereof. When the software is used to implement embodiments, the all or part of embodiments may be implemented in a form of a computer program product. A data-synchronized computer program product includes one or more data-synchronized computer program instructions. When the data-synchronized computer program instructions are loaded and executed on a computer, all or a part of the data synchronization procedures or functions according to embodiments of the present disclosure are generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium includes a readable storage medium that stores computer program instructions for training a classification model. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DIGITAL VERSATILE DISC (DVD)), or a semiconductor medium (for example, an SSD).

What is claimed is:

1. A system comprising:

a computing node configured to send, in response to target data meeting a computing pushdown condition, a data access request for accessing the target data, wherein the data access request carries a computing indication, and wherein the computing indication indicates a computing service that is to be performed to access the target data; and a first storage node communicatively coupled to the computing node and configured to:

receive the data access request;

obtain a dataset to which the target data belongs;

perform, based on the computing indication, the computing service;

access the target data in the dataset to obtain an access result; and feed back, to the computing node, the access result.

2. The system of claim 1, wherein the computing pushdown condition comprises one or more of:

a data type is a specified data type;

a data amount of the target data is greater than a data amount threshold;

a storage space that is to be occupied by the dataset and a free storage space in a memory of the computing node meet a preset relationship;

a load of the first storage node is less than a load threshold;

a computing manner that is to be performed on the target data is a preset computing manner; or a data access manner does not support a lock query.

3. The system of claim 1, further comprising a second storage node configured to store a part of data of the dataset, and wherein when obtaining the dataset, the first storage node is further configured to obtain, from the second storage node, the part.

4. The system of claim 1, wherein the first storage node is further configured to extract, from the dataset, one or more rows of data that meet a condition, and wherein the one or more rows of the data are the target data.

5. The system of claim 1, wherein the first storage node is further configured to extract, from the dataset, one or more columns of data that meet a condition, and wherein the one or more columns of the data are the target data.

6. The system of claim 1, wherein the first storage node is further configured to:

extract, from the dataset, the target data; and perform the computing service on the target data to obtain a computing result.

7. A method implemented by a first storage node in a storage system, wherein the method comprises:

receiving, from a computing node in the storage system, a data access request, wherein the data access request requests to access target data that meets a computing pushdown condition and carries a computing indication, wherein the computing pushdown condition comprises data type, a data amount, a storage space, a load of the first storage node, or a computing manner on the target data, and wherein the computing indication indicates a computing service that is to be performed to access the target data;

obtaining a dataset to which the target data belongs;

performing, based on the computing indication, the computing service;

accessing the target data in the dataset to obtain an access result of accessing the target data; and feeding back, to the computing node, the access result.

8. The method of claim 7, wherein obtaining the dataset comprises obtaining a part of data of the dataset from a second storage node in response to the part of the data being stored in the second storage node.

9. The method of claim 7, further comprising extracting one or more rows of data that meet a condition and that are from the dataset, wherein the one or more rows of the data are the target data.

10. The method of claim 7, further comprising extracting one or more columns of data that meet a condition and that are from the dataset, wherein the one or more columns of the data are the target data.

11. The method of claim 7, further comprising:

extracting, from the dataset, the target data; and performing the computing service on the target data to obtain a computing result.

12. A computing device comprising:

a memory configured to store instructions; and a processor coupled to the memory and configured to execute the instructions to cause the computing device to:

receive, from a computing node in a storage system, a data access request, wherein the data access request requests to access target data that meets a computing pushdown condition and carries a computing indication, wherein the computing pushdown condition comprises data type, a data amount, a storage space, a storage load, or a computing manner on the target data, and wherein the computing indication indicates a computing service that is to be performed to access the target data;

obtain a dataset to which the target data belongs;

perform, based on the computing indication, the computing service;

access the target data in the dataset to obtain an access result of accessing the target data; and feed back, to the computing node, the access result.

13. The computing device of claim 12, wherein the processor is further configured to execute the instructions to cause the computing device to obtain a part of data of the dataset from a storage node in response to the part of the data being stored in the storage node.

14. The computing device of claim 12, wherein the processor is further configured to execute the instructions to cause the computing device to extract one or more rows of data that meet a condition and that are from the dataset, and wherein the one or more rows of the data are the target data.

15. The computing device of claim 12, wherein the processor is further configured to execute the instructions to cause the computing device to extract one or more columns of data that meet a condition and that are from the dataset, and wherein the one or more columns of the data are the target data.

16. The computing device of claim 12, wherein the processor is further configured to execute the instructions to cause the computing device to:

extract, from the dataset, the target data; and perform the computing service on the target data to obtain a computing result.

17. The computing device of claim 16, wherein the computing service comprises performing a summation operation on the target data.

18. The computing device of claim 16, wherein the computing service comprises performing an averaging operation on the target data.

19. The computing device of claim 16, wherein the computing service comprises obtaining a minimum value from the target data.

20. The computing device of claim 16, wherein the computing service comprises obtaining a maximum value from the target data.

* * * * *